(12) United States Patent
Lombard et al.

(10) Patent No.: US 8,573,929 B2
(45) Date of Patent: Nov. 5, 2013

(54) TURBOCHARGER WITH TURBINE NOZZLE VANES AND AN ANNULAR ROTARY BYPASS VALVE

(75) Inventors: Alain Lombard, Chavelot (FR); Michel Thirion, Epinal (FR); Nicolas Serres, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 707 days.

(21) Appl. No.: 12/771,434

(22) Filed: Apr. 30, 2010

(65) Prior Publication Data

US 2011/0268559 A1 Nov. 3, 2011

(51) Int. Cl.
*F01D 17/00* (2006.01)

(52) U.S. Cl.
USPC .......................................... 415/145; 415/161

(58) Field of Classification Search
USPC ......... 415/144, 145, 161, 159, 183, 185, 191, 415/203, 204, 206, 208.2; 60/600, 602
See application file for complete search history.

(56) References Cited

U.S. PATENT DOCUMENTS

| | | | |
|---|---|---|---|
| 2,394,767 A * | 2/1946 | Hall | 123/80 DA |
| 3,957,392 A * | 5/1976 | Blackburn | 415/146 |
| 5,146,752 A | 9/1992 | Bruestle | |
| 5,372,485 A * | 12/1994 | Sumser et al. | 417/407 |
| 7,272,929 B2 * | 9/2007 | Leavesley | 60/602 |
| 7,458,764 B2 * | 12/2008 | Lombard et al. | 415/1 |
| 2003/0029168 A1 | 2/2003 | Hercey et al. | |
| 2005/0091976 A1 | 5/2005 | Whiting | |
| 2007/0169479 A1 | 7/2007 | Nicolle et al. | |
| 2008/0087018 A1* | 4/2008 | Woollenweber | 60/605.3 |
| 2009/0169366 A1* | 7/2009 | Petitjean et al. | 415/145 |
| 2009/0183506 A1 | 7/2009 | Trombetta et al. | |
| 2009/0224190 A1 | 9/2009 | Dale et al. | |

* cited by examiner

*Primary Examiner* — Edward Look
*Assistant Examiner* — Liam McDowell
(74) *Attorney, Agent, or Firm* — Alston & Bird LLP

(57) ABSTRACT

A turbocharger includes an annular bypass passage to allow exhaust gas to bypass the turbine wheel. An annular bypass valve is disposed in the bypass passage. The bypass valve comprises a fixed annular valve seat and a rotary annular valve member arranged coaxially with the valve seat. The valve member is disposed against the valve seat and is rotatable about the axis for selectively varying a degree of alignment between respective orifices in the valve seat and valve member. The turbine includes a nozzle having a vane assembly. In one embodiment the vane assembly has only fixed vanes. In another embodiment the vane assembly includes both fixed vanes and variable vanes, and the variable vanes are part of a rotor that rotates together with the rotary valve member.

13 Claims, 11 Drawing Sheets

TURBOCHARGER WITH TURBINE NOZZLE VANES AND AN ANNULAR ROTARY BYPASS VALVE

BACKGROUND OF THE INVENTION

The present disclosure relates to exhaust gas-driven turbochargers, and particularly to turbine arrangements that allow exhaust gas to bypass the turbine under certain engine operating conditions.

In a conventional turbocharger, the turbine housing defines a bypass conduit located generally to one side of the main bore through the housing, and the bypass conduit is connected to the exhaust gas inlet or the volute of the housing via a bypass valve. The bypass valve typically is a swing or poppet style valve comprising a circular valve member that is urged against a flat valve seat surrounding the bypass passage opening. The valve usually is arranged such that the exhaust gas pressure acts on the valve member in a direction tending to open the valve. One drawback associated with such an arrangement is that it is difficult to completely seal the valve in the closed position, since gas pressure tends to open the valve. Leakage past the closed bypass valve is a cause of performance degradation of the turbine and, hence, the turbocharger and its associated engine. The typical solution to the leakage issue is to preload the bypass valve member against the valve seat, but often this does not fully eliminate leakage, and in any event it causes additional problems such as an increase in the required actuation force for opening the valve.

Furthermore, swing or poppet valves tend to be poor in terms of controllability, especially at the crack-open point, and it is common for the bypass flow rate to be highly non-linear with valve position, which makes it very difficult to properly regulate the bypass flow rate. This leads to problems such as poor transient response of the turbocharger and engine system.

BRIEF SUMMARY OF THE DISCLOSURE

The present disclosure describes various embodiments of turbochargers having a novel bypass arrangement that seeks to address issues such as the ones noted above. In one embodiment, a turbocharger comprises a compressor wheel mounted within a compressor housing, a turbine housing defining at least part of a generally annular chamber extending circumferentially about a longitudinal axis of the turbine housing, the turbine housing defining a bore extending along the longitudinal axis, and a turbine wheel being disposed in the turbine housing. A nozzle passage leads from the chamber radially inwardly into the turbine wheel, and there is a vane assembly having vanes disposed in the nozzle passage for guiding exhaust gas flowing toward the turbine wheel. The turbine housing defines an annular bypass passage surrounding the bore and arranged to allow exhaust gas in the chamber to bypass the turbine wheel, and an annular bypass valve disposed in the bypass passage. The bypass valve comprises a fixed annular valve seat and a rotary annular valve member, the valve member being disposed against the valve seat and being rotatable about the longitudinal axis for selectively varying a degree of alignment between respective orifices defined through each of the valve seat and valve member, ranging from no alignment defining a closed condition of the bypass valve, to at least partial alignment defining an open condition of the bypass valve.

In one embodiment, the vane assembly is a variable vane assembly comprising fixed vanes disposed in the nozzle passage, and a rotor that is rotational with respect to the turbine housing about the longitudinal axis. The rotor defines a plurality of circumferentially spaced movable vanes each of which overlaps in a circumferential direction with a respective one of the fixed vanes to form a composite vane having a leading-edge portion defined by the movable vane and a trailing-edge portion defined by the fixed vane. The rotor is rotatable for varying a degree of overlap between the fixed and movable vanes. The rotor is mechanically coupled with the rotary valve member of the bypass valve such that the rotor and valve member rotate together.

The valve member defines a plurality of first orifices therethrough, and the valve seat defines a plurality of second orifices therethrough. Each first orifice has a corresponding second orifice.

The valve member can comprise a generally flat annular disk having the first orifices circumferentially spaced apart about a circumference of the valve member, and the valve seat can comprise a generally flat annular disk having the second orifices circumferentially spaced apart about a circumference of the valve seat, there being sufficient circumferential distance between adjacent second orifices to accommodate the first orifices therebetween in the closed condition of the bypass valve.

In some embodiments, one of the valve member and the valve seat includes raised pads surrounding the respective first or second orifices therein, the pads being in contact with a substantially planar surface of the other of the valve member and the valve seat so as to provide sealing between the valve member and the valve seat.

The first and second orifices can be circular or non-circular.

In one embodiment, a rotary drive member penetrates through the turbine housing in a direction generally transverse to the longitudinal axis about which the valve member rotates, and a drive arm is attached to a distal end of the rotary drive member. A distal end of the drive arm engages the rotor such that rotation of the rotary drive member causes the drive arm to rotate the rotor and the valve member about the longitudinal axis.

The valve seat and the fixed vanes of the variable vane assembly can be parts of an integral member. The integral member can include a tubular portion joined to the valve seat and extending axially therefrom and terminating at a forward end, and the fixed vanes can project from the forward end of the tubular portion.

In another embodiment, the vane assembly is a fixed-vane assembly comprising a plurality of fixed vanes disposed in the nozzle passage. The fixed vanes can project from a generally annular member formed separately from the turbine housing and mounted in the turbine housing such that the fixed vanes are disposed in the nozzle passage.

If desired or necessary in a particular application, surfaces of components that relatively slide over one another can be coated with a friction/wear coating that reduces wear of the surfaces. For example, the raised pads of the bypass valve and the surface they contact can be coated. The wear coating can be formed of various materials, including an aluminum diffusion coating, a nickel boron coating, a ceramic coating (e.g., silicon nitride). In order to avoid material transfer from one surface to the abutting surface, preferably the two surfaces are coated with different materials.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
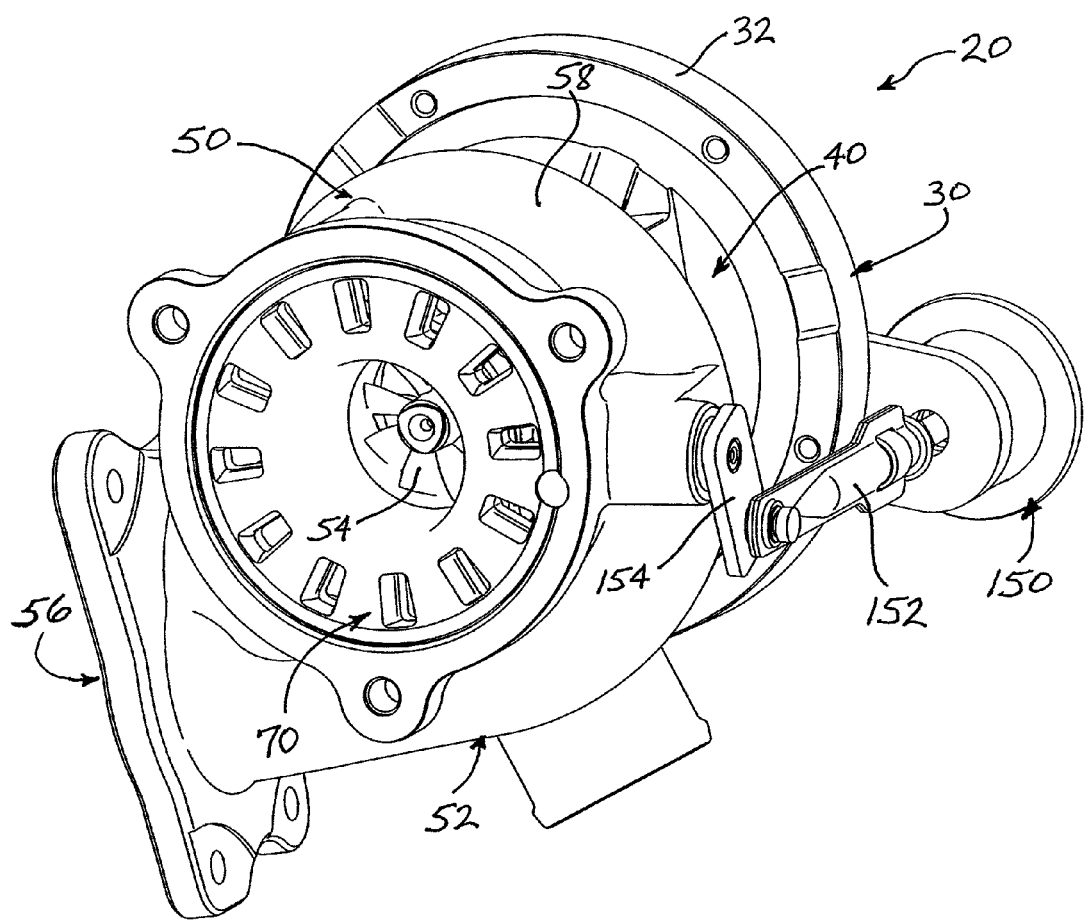
FIG. 1 is perspective view of a turbocharger in accordance with one embodiment of the present invention.

A turbocharger 20 in accordance with one embodiment of the present invention is shown in FIG. 1. As shown in FIG. 1, major sub-assemblies of the turbocharger 20 include a compressor assembly 30 and a turbine assembly 50. The compressor assembly 30 includes a compressor housing 32 and a compressor wheel (not visible in FIG. 1) mounted therein and attached to one end of a rotary shaft (not visible). A center housing assembly 40 includes a center housing that is affixed to the compressor housing 32 and that contains bearings for the rotary shaft. The turbine assembly 50 includes a turbine housing 52 and a turbine wheel 54 mounted therein and attached to the opposite end of the rotary shaft.

Figure 4:
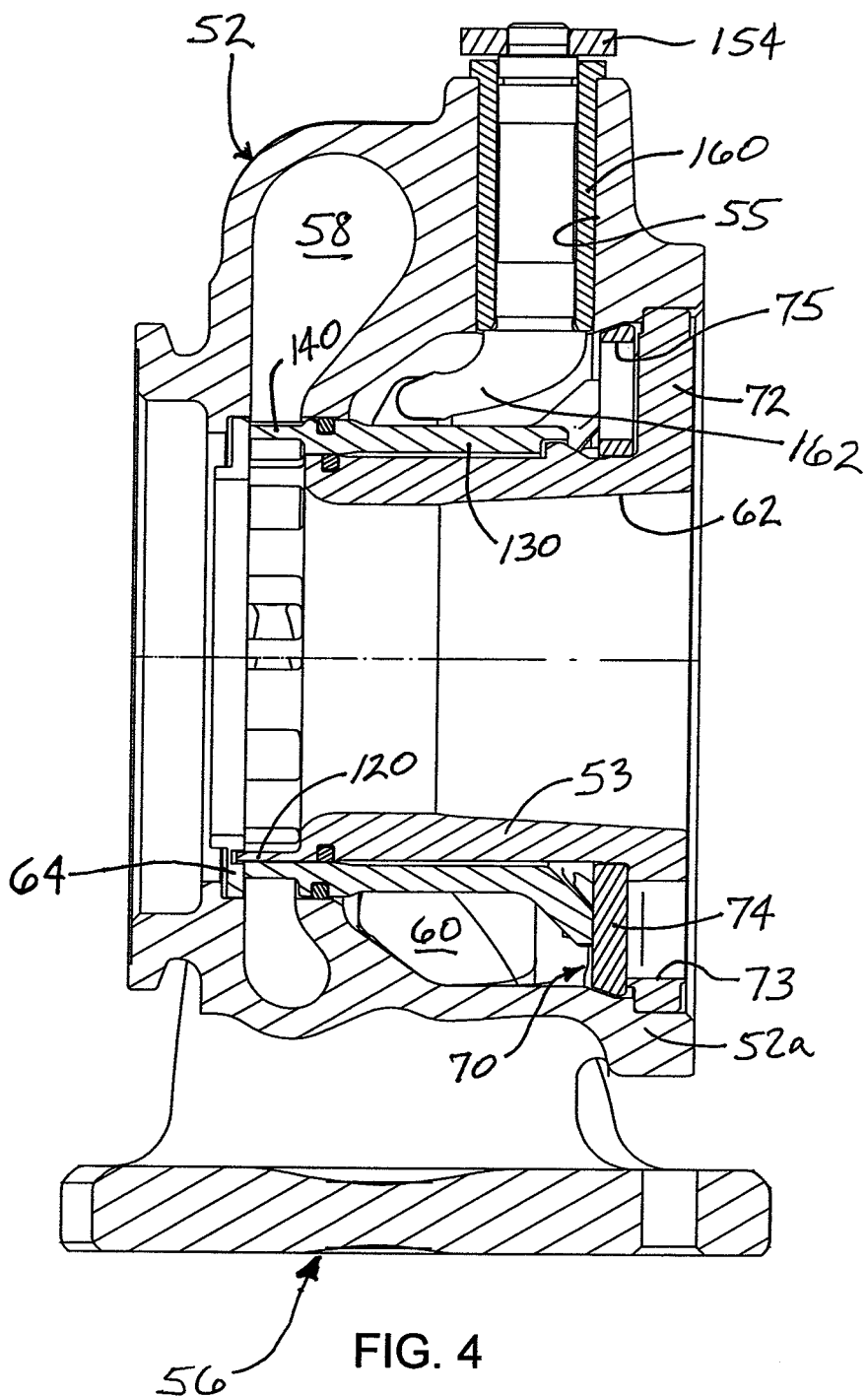
FIG. 4 is an axial cross-sectional view of a turbine assembly for the turbocharger of FIG. 1.

With reference to FIGS. 1 and 4, the turbine housing 52 defines an exhaust gas inlet 56 through which exhaust gas from an internal combustion engine is received, and a volute 58 that receives the exhaust gas from the inlet 56 and distributes the gas around the 360° volute for feeding into the turbine wheel 54. The exhaust gas inlet 56 is also open to a generally annular bypass passage 60 defined in the turbine housing 52. The bypass passage 60 surrounds an axial bore 62 defined in the turbine housing. Exhaust gas that has passed through the turbine wheel 54 is exhausted from the turbine housing through the bore 62. The bypass passage 60 provides an alternative pathway for exhaust gas to flow without first having to pass through the turbine wheel 54.

An annular bypass valve 70 is installed in the bypass passage 60 for regulating flow through the bypass passage. With primary reference to FIGS. 2-4, the major components of the annular bypass valve 70 include a stationary valve seat 72 and a rotary valve member 74 in abutting engagement with the valve seat. The valve seat 72 and valve member 74 are arranged between an annular outer portion 52a of the turbine housing 52 and an annular inner member 53 that is integral with the valve seat 72. The inner member 53 is tubular in form, and extends axially forward from the valve seat 72, terminating in a forward end. A plurality of fixed vanes 120 are formed at the forward end of the inner member 53 and extend axially forward therefrom, across the nozzle passage that leads from the turbine housing volute 58 radially inwardly to the turbine wheel. The valve member 74 is prevented from moving axially upstream (forward) by a tapering part of the outer portion 52a of the turbine housing, although during operation pressure of the exhaust gas urges the valve member 74 in the downstream direction against the valve seat 72. The valve member 74 is not constrained by the turbine housing but is free to rotate about its axis and to move axially against the valve seat 72. The valve seat 72 is prevented from moving axially, radially, or rotationally.

The valve seat 72 (best illustrated in FIG. 2) is a generally flat ring-shaped or annular member having a plurality of orifices 73 circumferentially spaced apart about a circumference of the valve seat, the orifices 73 extending generally axially between the upstream and downstream faces of the valve seat. The orifices 73 in the illustrated embodiment are uniformly spaced about the circumference of the valve seat, but as further described below, non-uniform spacing of the orifices is also possible and can be advantageous in some circumstances.

The rotary valve member 74 (best illustrated in FIG. 3) is a generally flat ring-shaped or annular member having a plurality of orifices 75 circumferentially spaced apart about a circumference of the valve seat, the orifices 75 extending generally axially between the upstream and downstream faces of the valve member. The orifices 75 in the illustrated embodiment are uniformly spaced about the circumference of the valve member, and the number and spacing of the orifices 75 in the valve member are the same as the number and spacing of the orifices 73 in the valve seat. However, as further described below, non-uniform spacing of the orifices 75 is also possible and can be advantageous in some circumstances; furthermore, the spacings of the orifices 73 and 75 do not have to be the same, and in some cases it can be advantageous for the spacings to be different. The valve member 74 has a substantially circular outer edge 76 and a substantially circular inner edge 78, the outer and inner edges 76, 78 being coaxial with respect to a central longitudinal axis of the valve member, which axis is also substantially coincident with a central longitudinal axis of the valve seat 72. The outer portion 52a of the turbine housing and the inner member 53 both define substantially circular bearing surfaces for the outer and inner edges 76, 78 of the rotary valve member 74 and there are clearances therebetween, so that the valve member can be rotated in one direction or the opposite direction about its central longitudinal axis in order to vary a degree of alignment between the valve member orifices 75 and the valve seat orifices 73, as further described below.

Figure 2:
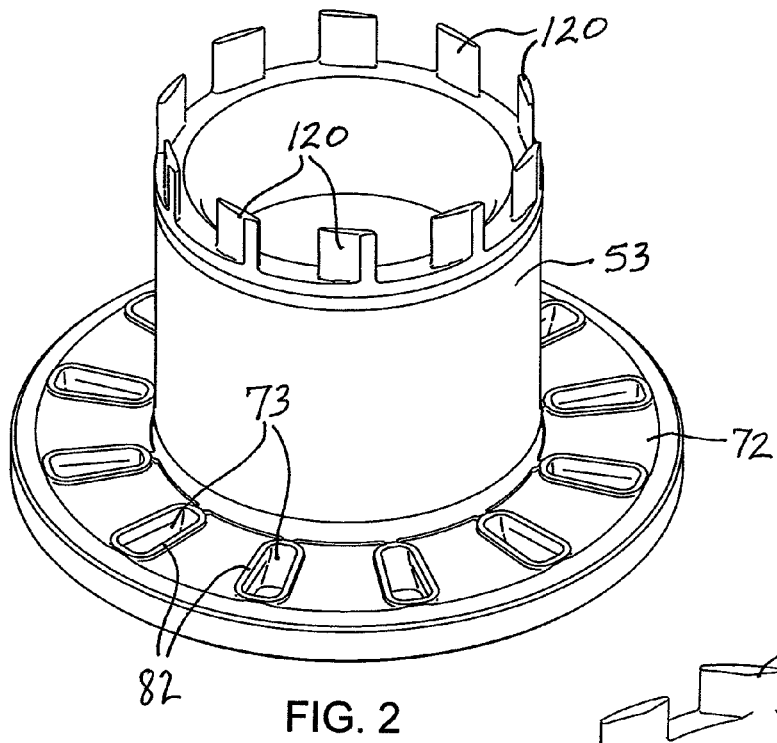
FIG. 2 is a perspective view of an integral member that defines a valve seat and a plurality of fixed vanes for the turbocharger of FIG. 1.

With reference particularly to FIG. 2, each of the orifices 73 in the valve seat 72 has a raised pad 82 surrounding it. The pads 82 abut the planar face of the valve member 74 (FIG. 4) and serve as seals to help seal the interface between the valve member and valve seat. The provision of the raised pads 82 reduces the total surface area of the valve seat 72 in frictional contact with the rotary valve member 74, thereby reducing the total friction forces that the actuation system must overcome to rotate the valve member.

Figure 3:
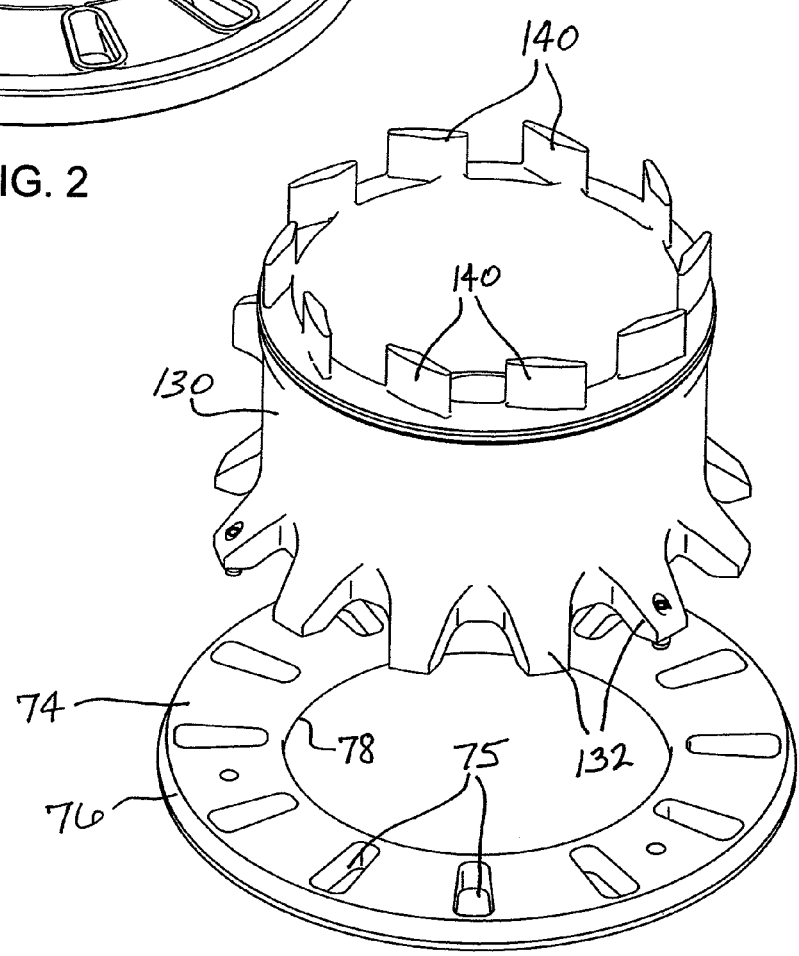
FIG. 3 is an exploded view of an assembly comprising a rotary valve member and a rotor that defines a plurality of movable vanes for the turbocharger of FIG. 1.
Figure 5:
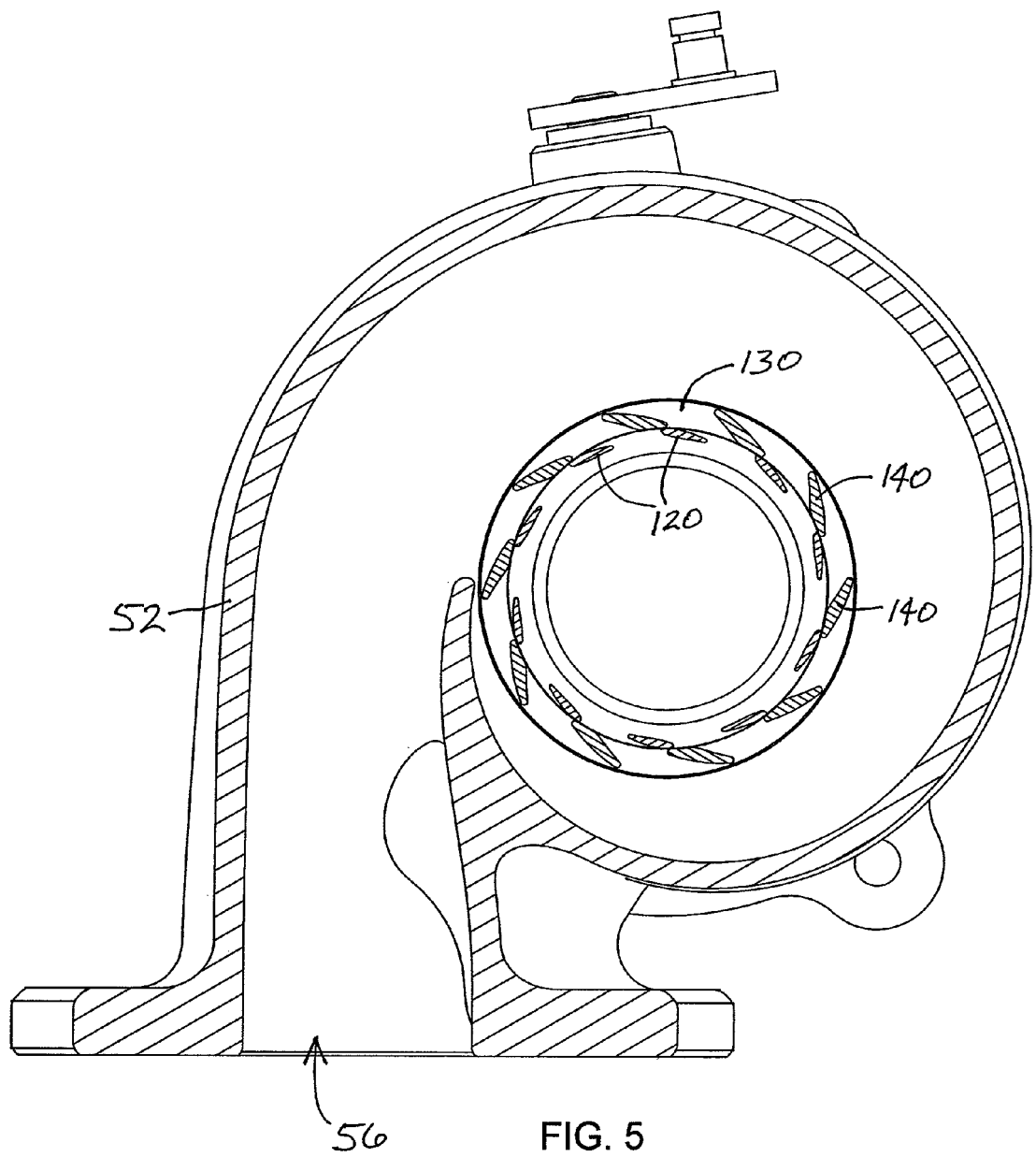
FIG. 5 is a cross-sectional view of the turbine assembly along line 5-5 of FIG. 4, showing the movable vanes in a relatively closed position.
Figure 6:
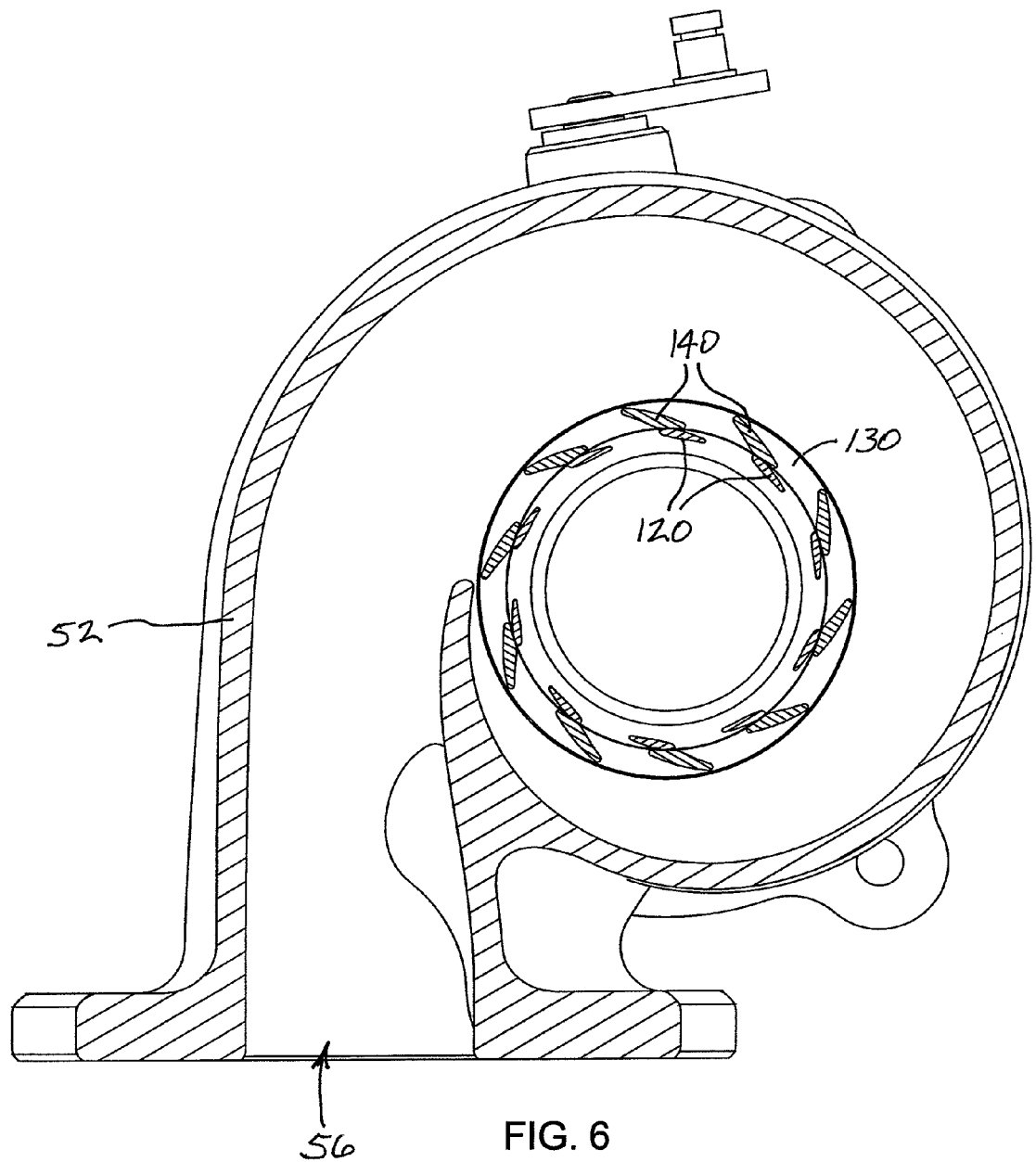
FIG. 6 is a view similar to FIG. 5 showing the movable vanes in a relatively open position.

Connected to the valve member 74 is a rotor 130 (see FIG. 3 in particular). The rotor 130 is generally tubular, but includes a plurality of "feet" 132 at its downstream end. The feet 132 are spaced apart such that each foot engages the valve member 74 at a location between two adjacent orifices 75. Some of the feet include apertures therethrough for receiving a threaded fastener that passes into a threaded hole in the valve member 74 and serves to attach the rotor 130 to the valve member 74. Thus, the rotor 130 and valve member 74 are constrained to rotate together. At the forward end of the rotor 130 are a plurality of vanes 140 equal in number and spacing to the fixed vanes 120 on the member 53. The fixed vanes 120 and the movable vanes 140 (i.e., they are movable by virtue of being mounted fixedly on the rotatable rotor 130) thus form mating pairs, whereby one fixed vane 120 and one movable vane 140 collectively define a "composite" vane whose geometry is variable by rotating the rotor 130. Such rotation causes the degree of overlap between the fixed and movable vanes 120, 140 to vary, as best illustrated in FIGS. 5 and 6. The movable vanes 140 form the leading-edge portions of the composite vanes, and the fixed vanes 120 form the trailing edge portions.

Thus, FIG. 5 shows the rotor 130 in a position that may be called "relatively closed" in which the vanes 120, 140 have a lesser degree of overlap. This has the effect of reducing the flow area of the passages between the vanes. FIG. 6 shows the rotor 130 in a position that may be called "relatively open" in which the vanes 120, 140 have a greater degree of overlap. This has the effect of increasing the flow area of the passages between the vanes.

Figure 7:
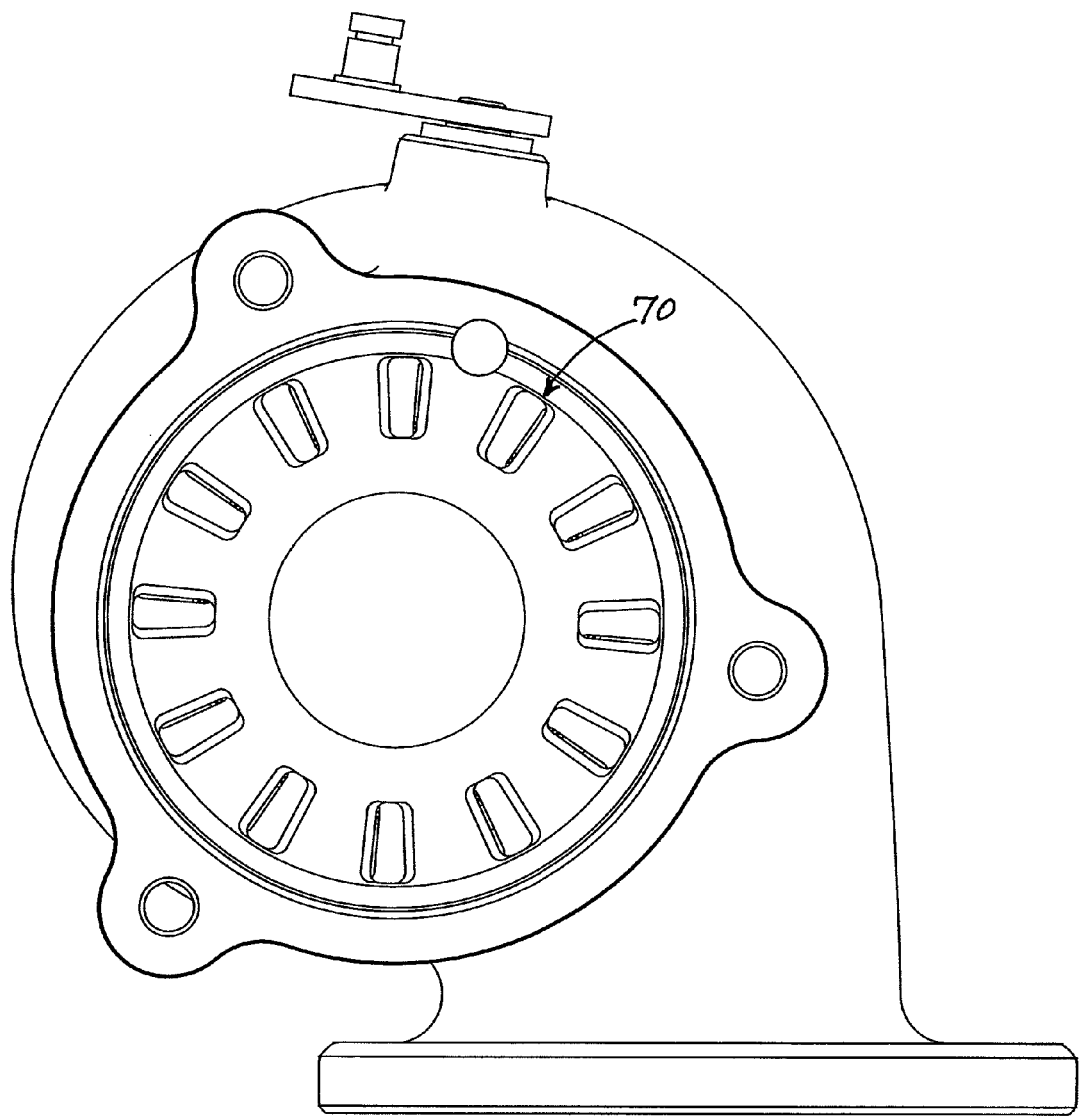
FIG. 7 is a view of the turbine assembly along the axial direction (toward the left in FIG. 4) showing the bypass valve in a relatively closed position.
Figure 8:
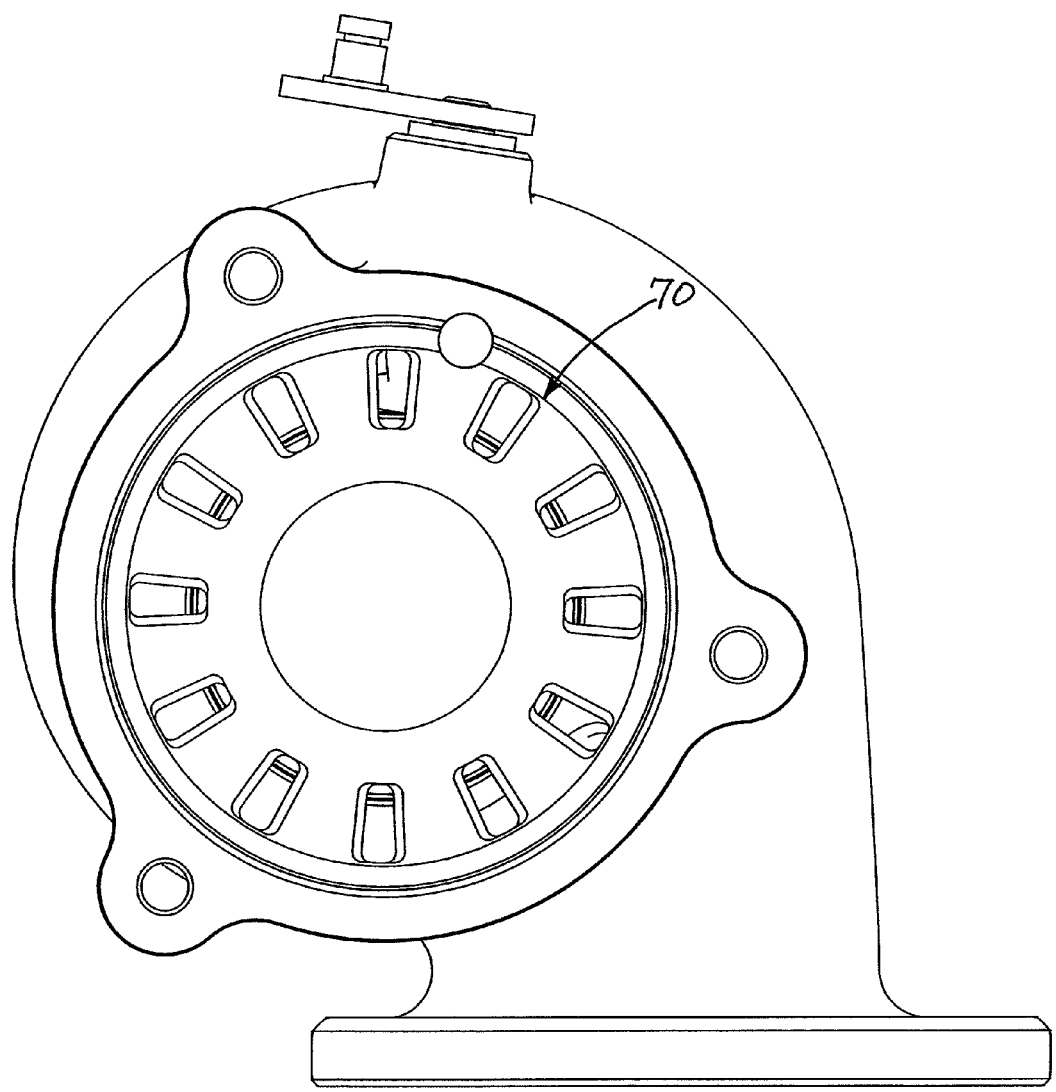
FIG. 8 is a view similar to FIG. 7 showing the bypass valve in a relatively closed position.
Figure 9:
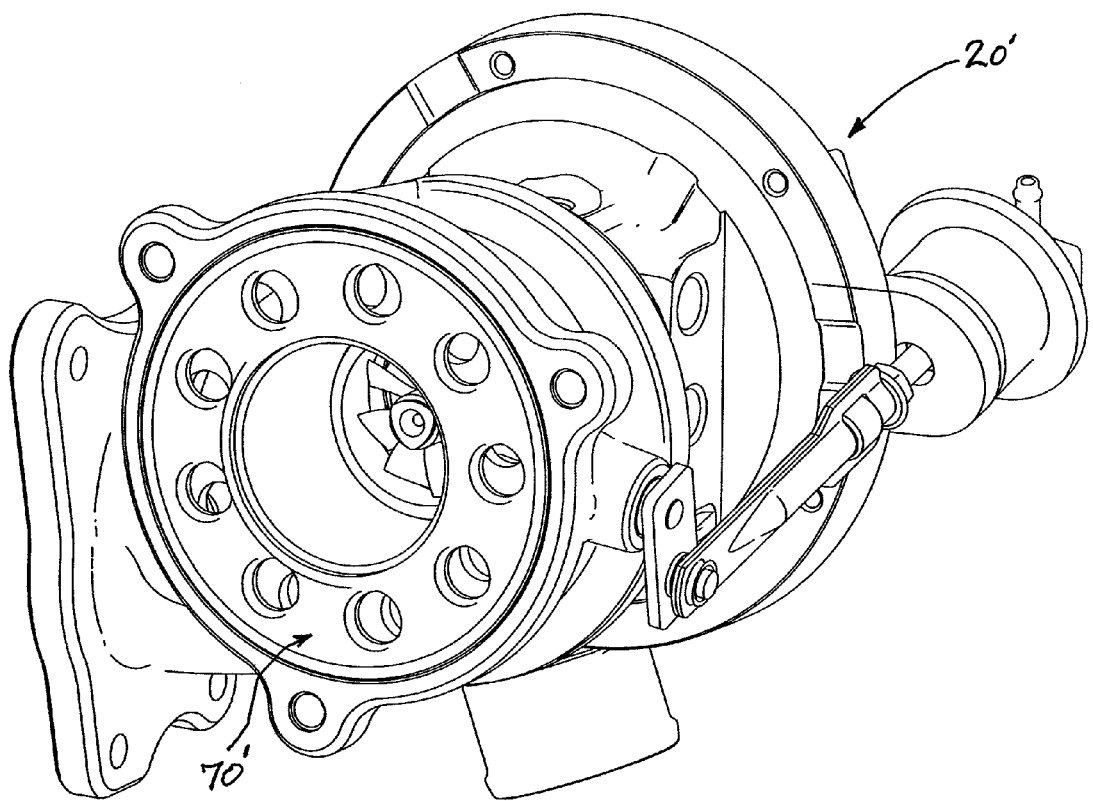
FIG. 9 is a perspective view of a turbocharger in accordance with an alternative embodiment of the invention having only fixed vanes in the nozzle.
Figure 10:
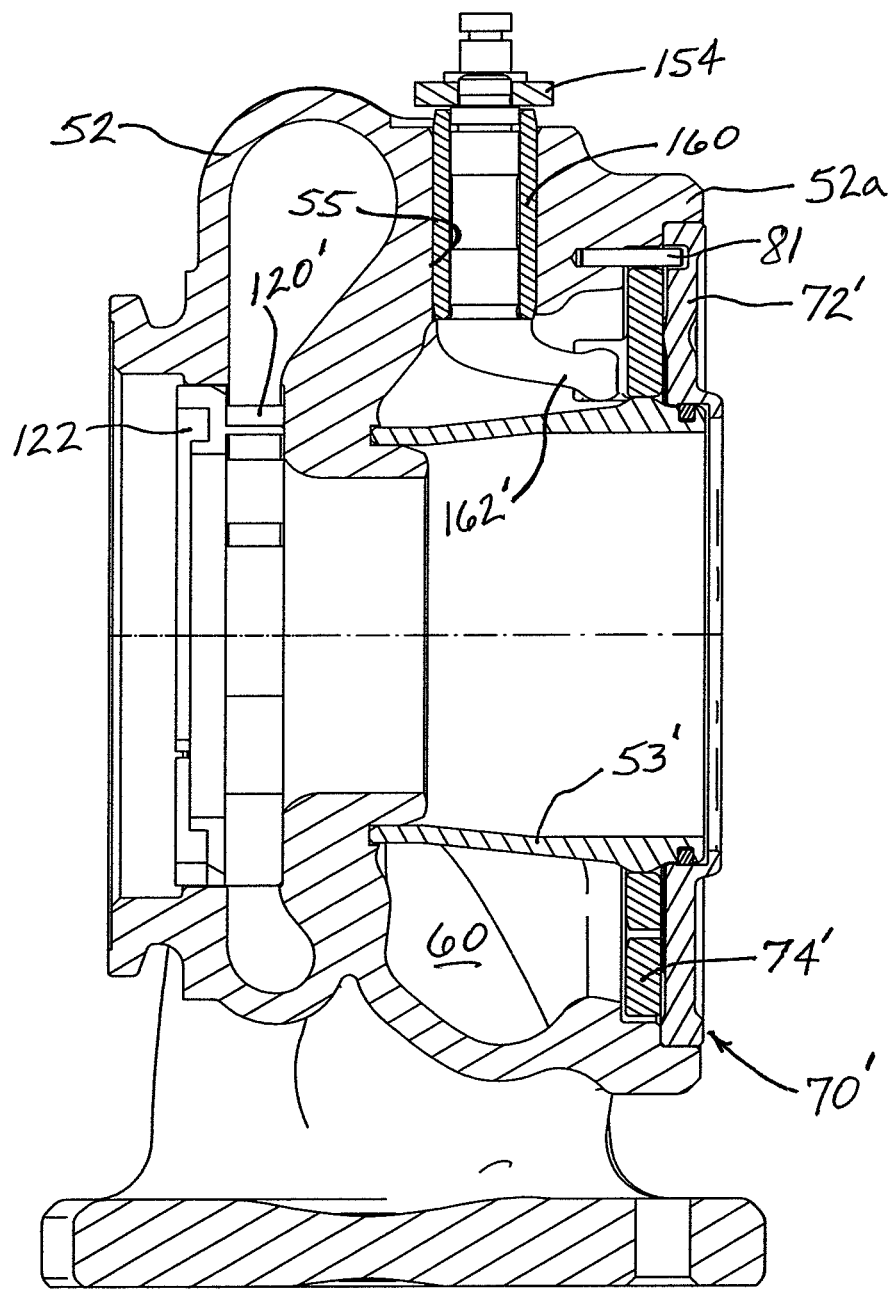
FIG. 10 is an axial cross-sectional view of a turbine assembly for the turbocharger of FIG. 9.
Figure 11:
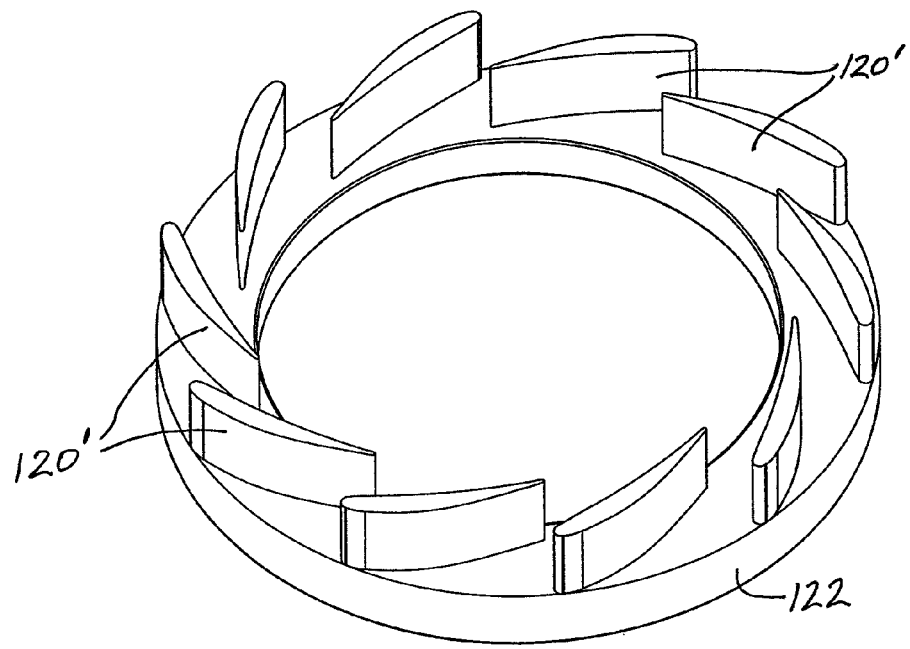
FIG. 11 is a perspective view of an annular member that carries the fixed vanes for the embodiment of FIG. 9.

It will be recognized based on the foregoing description that when the rotor 130 is rotated in this fashion, the bypass valve 70 is also being adjusted. FIGS. 7 and 8 illustrate two different positions of the bypass valve corresponding to the two positions of the rotor shown in FIGS. 5 and 6. In FIG. 7, which corresponds to the position of the rotor in FIG. 5, the bypass valve is relatively closed. In FIG. 8, which corresponds to the position of the rotor in FIG. 6, the bypass valve is relatively open.

As shown in FIG. 4, a shroud 64 is installed in the turbine housing adjacent the free ends of the vanes 120, 140. A spring (not shown) biases the shroud 64 in the downstream direction (to the right in FIG. 4), against the ends of the movable vanes 140, thus biasing the rotor 130 and the valve member 74 in the downstream direction. This causes the valve member 74 to be urged against the valve seat 72. The spring allows thermal expansion of the parts without binding.

With reference to FIGS. 1 and 4, rotation of the rotor 130 and valve member 74 is accomplished by an actuator 150 having an actuator rod 152 that is connected to one end of a linkage 154. The other end of the linkage 154 is rigidly connected to a rotary drive member 160. The rotary drive member 160 penetrates substantially radially through the turbine housing 52 via a bore 55 (see FIG. 4) that connects with the generally annular bypass passage 60. Thus, extension of the actuator rod 152 causes the link 154 to rotate the rotary drive member 160 in one direction and retraction of the actuator rod causes the link to rotate the rotary drive member in the opposite direction. A drive arm 162 is connected to the radially inner end of the rotary drive member 160. The drive arm 162 is generally "L"-shaped so that its distal end moves generally circumferentially in one direction or the other in response to rotation of the drive member 160 in one direction or the other. The distal end of the drive arm 162 engages the rotor 130 (e.g., the rotor 130 can include a fork that receives the end of the drive arm) so as to transmit its circumferential movement to the rotor. As a result, the drive arm 162 affixed to the distal end of the rotary drive member 160 in turn causes rotor 130 and the valve member 74 to be rotated in one direction or the opposite direction about its axis.

A turbocharger 20' in accordance with an alternative embodiment of the invention is depicted in FIGS. 9-12. In this embodiment, a bypass valve 70' is provided that generally corresponds to the bypass valve 70 of the previous embodiment, having a fixed valve seat 72' and a rotary valve member 74'. However, in this embodiment the valve member 74' is not joined to a rotor that carries vanes. Furthermore, the valve seat 72' is not integral with a member that carries fixed vanes. Instead, fixed vanes 120' are formed on a separate, generally annular member 122 that is installed in the turbine housing 52 such that the vanes 120' extend axially (in the downstream direction, i.e., toward the right in FIG. 10) across the nozzle passage. The bypass valve 70' is disposed between an outer portion 52a of the turbine housing and an inner member 53' that is generally tubular or conical in configuration. The downstream end of the inner member 53' fits within the central opening of the ring-shaped valve seat 72' and an O-ring is disposed therebetween to seal the interface. The upstream end of the inner member 53' engages an axially facing annular groove formed in the turbine housing. The bypass passage 60 is defined between the turbine housing and the inner member 53'.

A spring (not shown) biases the annular member 122 in the downstream direction (to the right in FIG. 10), so that the ends of the vanes 120' are urged against the opposite wall of the nozzle passage. This ensures that there is zero clearance between the vane ends and the nozzle wall (thus maximizing efficiency), while still allowing thermal expansion of the parts.

Figure 12:
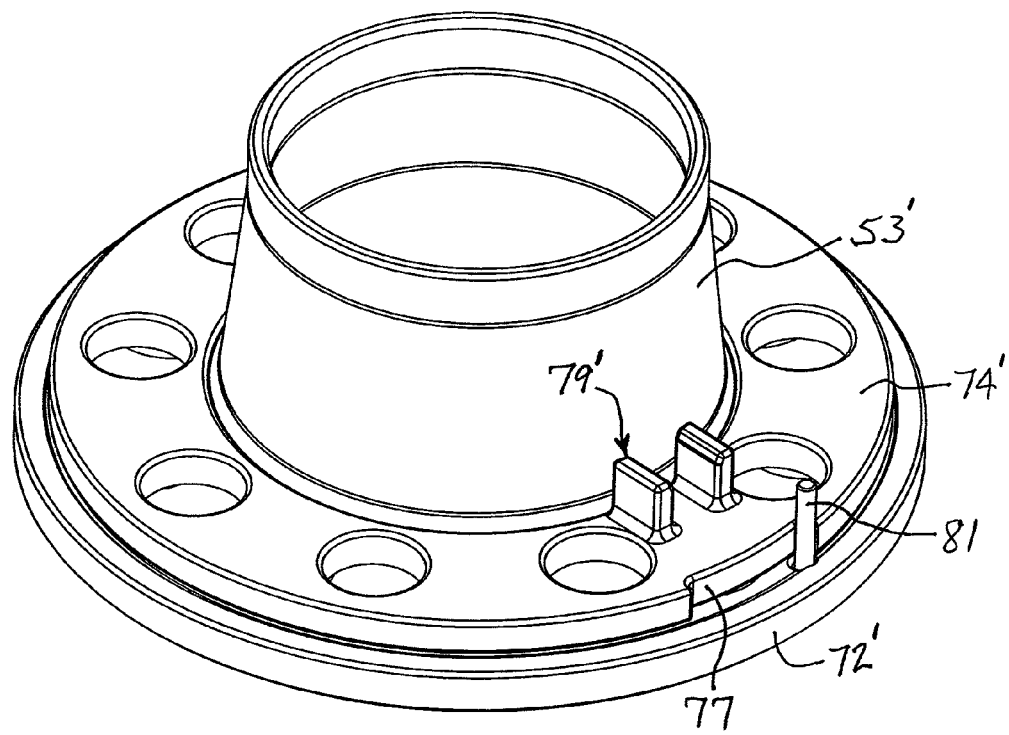
FIG. 12 is a perspective view of a bypass valve of the embodiment of FIG. 9.
Figure 13:
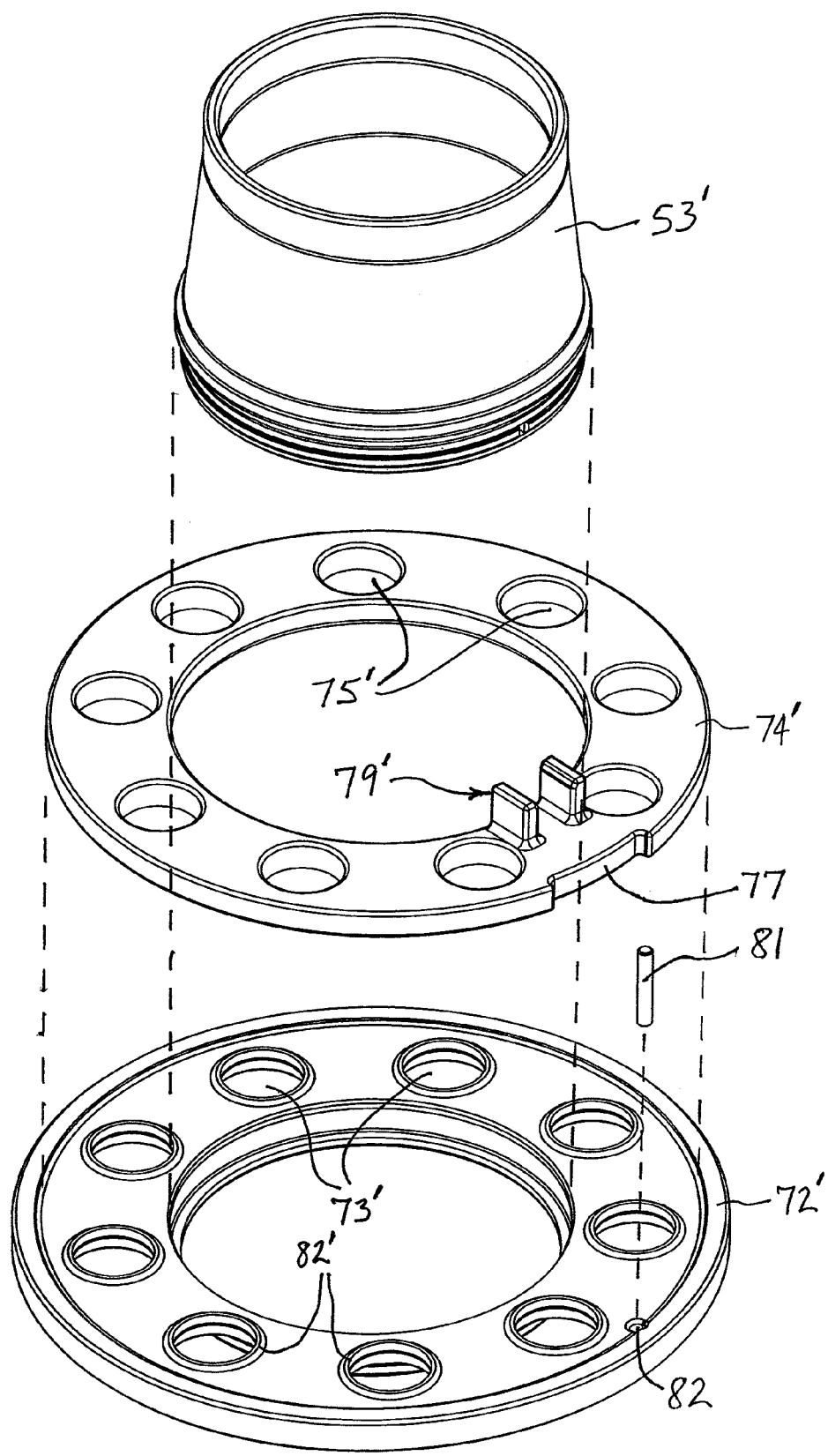
FIG. 13 is an exploded view of the bypass valve shown in FIG. 12.

As best seen in FIGS. 12 and 13, the orifices 75' in the valve member 74' and the orifices 73' in the valve seat 72' are circular in this embodiment. However, they could instead be non-circular as in the previous embodiment. Raised pads 82' surround the valve seat orifices. The valve member 74' rotates about its axis, driven by the rotary drive member 160. The drive arm 162' (FIG. 10) attached to the rotary drive member is engaged between the members of a fork 79' formed on the valve member 74'. A pin 81 is fixedly installed in a hole 82 in the valve seat 72' and extends axially upstream and is engaged in a recess 77 formed in the radially outer edge of the valve member 74'. The recess 77 has a circumferential extent corresponding to the desired maximum circumferential motion of the valve member 74'. The pin 81 thus forms a stop that limits the movement of the valve member in the open and closed directions.

In operation, exhaust gas flow regulation in the turbocharger of FIGS. 1-8 is accomplished by a simple rotation of the rotor 130. This simultaneously changes the geometry of the "composite" vanes 120, 140 and moves the bypass valve 70. For example, when a relatively low flow rate through the turbine is required, the rotor 130 is rotated in the closed direction to position the composite vanes as shown in FIG. 5. In this position, the bypass valve 70 is closed (FIG. 7). As the required flow rate increases, the rotor can be rotated toward its open position, which moves the vanes toward their open configuration (FIG. 6) and simultaneously moves the bypass valve 70 toward its open position (FIG. 8). The geometry of the bypass valve 70 can be configured such that the valve begins to open immediately as the rotor begins to move from the closed position toward the open position; alternatively, the valve can be configured so that it remains closed during the initial movement of the rotor toward the open position and then begins to open as the rotor continues to rotate toward the open position. The valve geometry shown in FIGS. 2 and 3 is an example of the latter configuration, since the circumferential extent of each of the valve member orifices 75 is smaller than the circumferential extent of the spaces between the valve seat orifices 73. Thus, if in the closed position of the valve the valve member orifices 75 are midway between the valve seat orifices 73, the initial rotational movement of the valve member 74 does not begin to open the valve. The valve begins to open only when the orifices 73, 75 begin to overlap.

Exhaust gas flow regulation in the alternative embodiment of FIGS. 9-13 is likewise accomplished by a simple rotation of the bypass valve member 74', but of course the turbine nozzle vanes 120' remain fixed and hence do not play a role in flow regulation. Since flow regulation is accomplished solely by the bypass valve 70', quick responsiveness of the bypass valve is accomplished by sizing the orifices 73' and 75' so that each valve member orifice 75' occupies substantially all of the circumferential space between two valve seat orifices 73'. Accordingly, the orifices begin to overlap immediately upon rotation of the valve member. The angular length of the recess 77 in the valve member is equal to the angular distance between the valve seat orifices 73', and the pin 81 in the closed position of the valve is against one end of recess 77. Thus, when the pin reaches the other end of the recess, the orifices 73' and 75' overlap to their fullest extent, defining the fully open position of the valve.

With the described annular bypass valve 70 or 70', exhaust gas pressure acts on the valve member 74, 74' in a direction toward the fixed valve seat 72, 72', thereby tending to improve sealing between the valve member and valve seat. Furthermore, the gas pressure does not tend to open the valve, in contrast to the aforementioned swing and poppet style bypass valve arrangements in which gas pressure acts in a direction tending to open the valve and cause leakage. The improved sealing made possible by the valve is thought to be significant because it can improve the transient response time of the turbocharger, by making better use of instantaneous engine pulses in the exhaust gas stream, especially at low engine speeds and gas flow rates where the pulse impact is most significant in regard to turbine efficiency.

A further advantage is that the valve 70, 70' can achieve better controllability than is typically possible with swing or poppet valves, particularly at the crack-open point. In particular, the evolution of the shape and size of the flow passages through the valve as the valve member 74, 74' is rotated can be tailored to the needs of a particular application simply by suitably configuring the sizes, angular locations (e.g., whether uniformly or non-uniformly spaced apart), and shapes of the orifices in the valve member and valve seat. Thus, while the orifices 73, 75 are shown as being circular in the drawings, alternatively they can be made non-circular as a way of altering the evolution of the flow passages as the valve opens. For example, the orifices could be made generally rectangular with their edges extending generally radially (possibly with a larger dimension in the radial direction than in the circumferential direction), which would result in a greater change in flow passage size per degree of valve member rotation, in comparison with the circular orifice shape.

As another example of the fine-tuning of the evolution of the valve flow passages made possible by the invention, the valve seat orifices 73, 73' could have a first circumferential spacing (e.g., uniform) about the circumference, and the valve member orifices 75, 75' could have a second circumferential spacing (e.g., non-uniform) different from the first circumferential spacing. It is further possible (though not essential) in such an embodiment for the orifices in the valve member to be of different sizes and/or shapes from the orifices in the valve seat. This could result in, for example, one flow passage (or some other subset of the total number of flow passages) beginning to open before any of the other flow passages begin to open, thereby achieving a very gradual cracking open of the bypass valve. Further rotation of the valve member would then cause the other flow passages to open (perhaps in a sequential or staged fashion, e.g., one flow passage opening at a time until finally all flow passages are open). These are merely some examples of the many different ways the orifices can be configured so as to achieve a desired flow passage evolution as a function of valve member rotation.

As noted, if desired or necessary in a particular application, surfaces of components that relatively slide over one another can be coated with a friction/wear coating that reduces wear of the surfaces. For example, the raised pads 82, 82' and/or the surface of the valve member that the pads contact can be coated. Other surfaces that can be coated include the end of the L-shaped drive arm 162, 162' and/or the surfaces of the rotor 130 or valve member 74' contacted by the end of the drive arm. The radially inner and/or outer surfaces of the valve member 74 and/or the confronting surfaces of the turbine housing portion 52a and the member 53, 53' can be coated with the wear coating. The wear coating can be formed of various materials, including an aluminum diffusion coating, a nickel boron coating, a ceramic coating (e.g., silicon nitride). In order to avoid material transfer from one surface to an abutting surface, preferably the two surfaces are coated with different materials.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger comprising:
   a compressor wheel mounted within a compressor housing;
   a turbine housing defining at least part of a generally annular chamber extending circumferentially about a longitudinal axis of the turbine housing, the turbine housing defining a bore extending along the longitudinal axis;
   a turbine wheel disposed in the turbine housing;
   a nozzle passage leading from the chamber radially inwardly into the turbine wheel;
   a variable vane assembly having vanes disposed in the nozzle passage for guiding exhaust gas flowing toward the turbine wheel;
   the turbine housing defining an annular bypass passage surrounding the bore and arranged to allow exhaust gas in the chamber to bypass the turbine wheel; and
   an annular bypass valve disposed in the bypass passage, the bypass valve comprising a fixed annular valve seat and a rotary annular valve member, the valve member being disposed against the valve seat and being rotatable about the longitudinal axis for selectively varying a degree of alignment between respective orifices defined through each of the valve seat and valve member, ranging from no alignment defining a closed condition of the bypass valve, to at least partial alignment defining an open condition of the bypass valve;

wherein the variable vane assembly comprises fixed vanes disposed in the nozzle passage, and a rotor that is rotational with respect to the turbine housing about the longitudinal axis, wherein the rotor defines a plurality of circumferentially spaced movable vanes each of which overlaps in a circumferential direction with a respective one of the fixed vanes to form a composite vane having a leading-edge portion defined by the movable vane and a trailing-edge portion defined by the fixed vane, the rotor being rotatable for varying a degree of overlap between the fixed vanes and the movable vanes; and wherein the rotor is mechanically coupled with the rotary valve member of the bypass valve such that the rotor and valve member rotate together.

2. The turbocharger of claim 1, the valve member defining a plurality of first orifices therethrough, the valve seat defining a plurality of second orifices therethrough, and each first orifice having a corresponding second orifice.

3. The turbocharger of claim 2, wherein the valve member is a generally flat annular disk having the first orifices circumferentially spaced apart about a circumference of the valve member, and the valve seat is a generally flat annular disk having the second orifices circumferentially spaced apart about a circumference of the valve seat, there being sufficient circumferential distance between adjacent second orifices to accommodate the first orifices therebetween in the closed condition of the bypass valve.

4. The turbocharger of claim 3, wherein one of the valve member and the valve seat includes raised pads surrounding the respective first or second orifices therein, the pads being in contact with a substantially planar surface of the other of the valve member and the valve seat so as to provide sealing between the valve member and the valve seat.

5. The turbocharger of claim 4, wherein at least one of the raised pads and the planar surface contacted by the raised pads includes a surface wear coating that reduces wear caused by relative sliding contact between the raised pads and the planar surface.

6. The turbocharger of claim 3, wherein the first and second orifices are circular.

7. The turbocharger of claim 3, wherein the first and second orifices are non-circular.

8. The turbocharger of claim 1, further comprising a rotary drive member penetrating through the turbine housing in a direction generally transverse to the longitudinal axis about which the valve member rotates, and a drive arm attached to a distal end of the rotary drive member, a distal end of the drive arm engaging the rotor such that rotation of the rotary drive member causes the drive arm to rotate the rotor and the valve member about the longitudinal axis.

9. The turbocharger of claim 1, wherein the valve seat and the fixed vanes are parts of an integral member.

10. The turbocharger of claim 9, wherein the integral member includes a tubular portion joined to the valve seat and extending axially therefrom and terminating at a forward end, wherein the fixed vanes project from the forward end of said tubular portion.

11. The turbocharger of claim 10, wherein the valve member is a generally flat annular disk having the first orifices circumferentially spaced apart about a circumference of the valve member, and the valve seat is a generally flat annular disk having the second orifices circumferentially spaced apart about a circumference of the valve seat.

12. The turbocharger of claim 10, wherein the first and second orifices are circular.

13. The turbocharger of claim 10, wherein the first and second orifices are non-circular.

* * * * *